Figure 1:
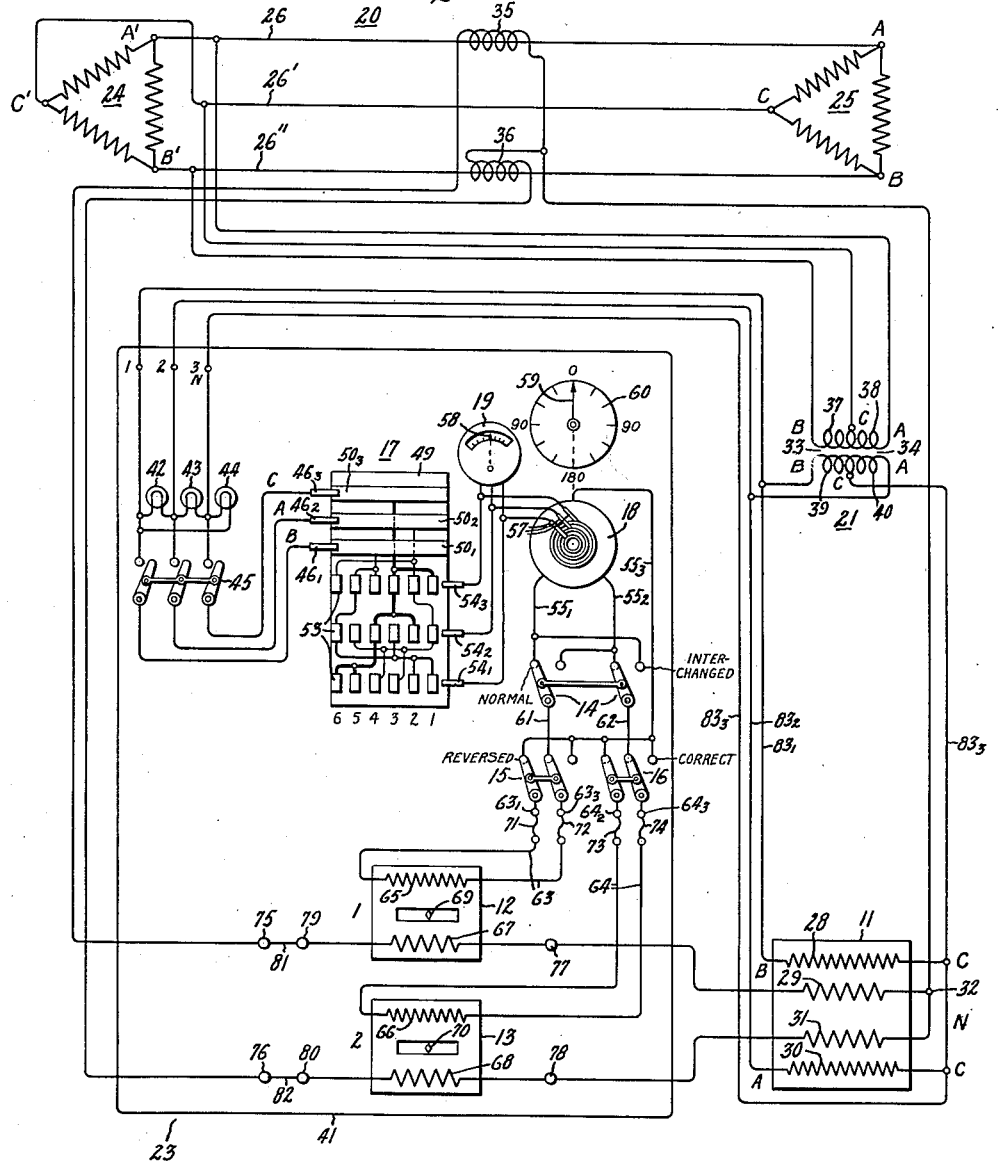

March 31, 1936.   C. H. THAYER   2,035,996
METER CONNECTION CHECKING DEVICE
Filed May 8, 1935   2 Sheets-Sheet 2

Inventor:
Charles H. Thayer,
by Harry E. Dunham
His Attorney.

Patented Mar. 31, 1936

2,035,996

UNITED STATES PATENT OFFICE 2,035,996

METER CONNECTION CHECKING DEVICE

Charles H. Thayer, Ashland, Mass., assignor to General Electric Company, a corporation of New York Application May 8, 1935, Serial No. 20,367

11 Claims. (Cl. 175—183)

My invention relates to electrical instruments and concerns particularly a method and an arrangement for checking the connections of power-responsive devices in alternating-current electrical circuits, especially in polyphase circuits.

Power-responsive devices, such as watt-hour meters, wattmeters, power relays, and so forth, usually have both current windings and potential windings. In the case of high tension circuits these windings are ordinarily energized through potential and current transformers and as the instruments and transformers are seldom mounted close together, it is difficult to determine the relationship between the instrument leads and the high tension conductors. In the case of polyphase circuits for which instruments with several current and potential windings must be employed, the proper connection of the instruments becomes a complicated matter. For example, in case of a three-phase system with current elements of the instrument associated with two of the system line conductors and potential elements associated with two pairs of line conductors there are eight leads to be brought from the transformers to the instruments.

Even if the circuit can readily be traced out and even if instrument transformers are not employed, the proper connection of the instruments, particularly three-phase instruments with all the windings in one composite structure, including a single moving member, presents considerable difficulty to a person without engineering knowledge. Incorrect connections will not readily be detected but will cause incorrect indications or registrations. In the case of watt-hour meters, this condition may be particularly serious, owing to the continuous connection of such devices to the circuits and the continuous accumulation of errors in registration in case of incorrect connections.

It is accordingly an object of my invention to provide a device and a method whereby connections of power-responsive devices may be checked easily and quickly by a person not having engineering knowledge without the necessity for any calculations or the drawing of any vector diagrams and without tracing the leads to the instruments from the transformers or from the circuit to be measured. Other and further objects and advantages will become apparent as the description proceeds.

In accordance with my invention in its preferred form, I provide a set of single-phase test wattmeters connected to a panel with terminals which may be arranged to simulate those of the device to be tested or checked. The arrangement permits simulating exactly the connections of the tested apparatus. Several test switches are provided for reversing and interchanging the actual connections of the test wattmeters until they are made to deflect in a way that indicates the connections are correct. The positions of the test switches then indicate the changes that are required to correct the connection of the device being tested or checked.

Figure 2:
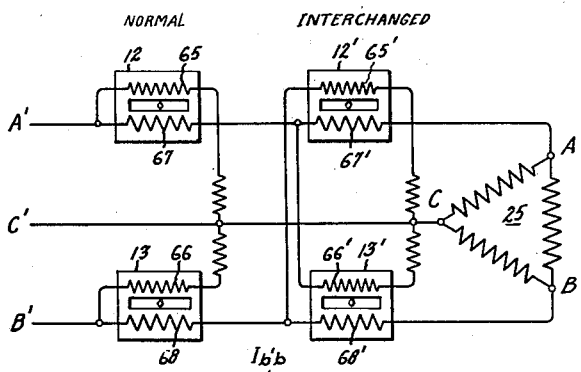
Figure 3:
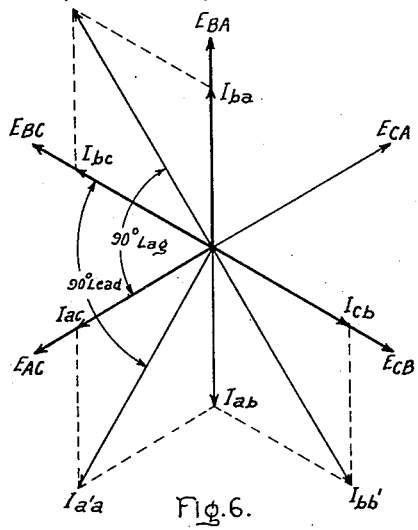
Figure 4:
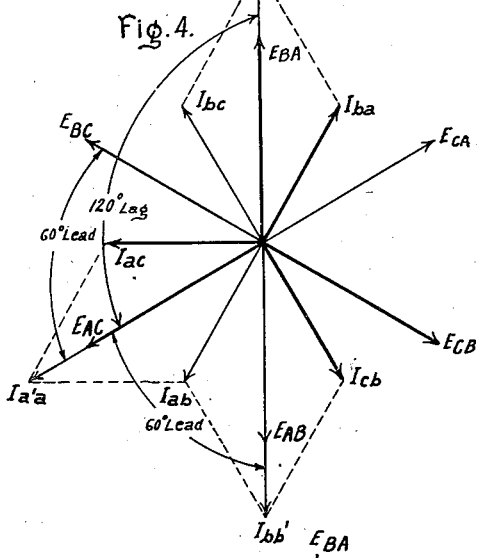
Figure 6:
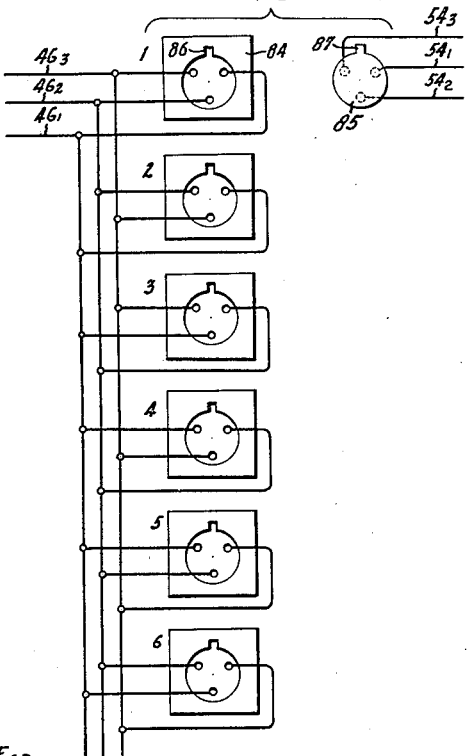
Figure 5:
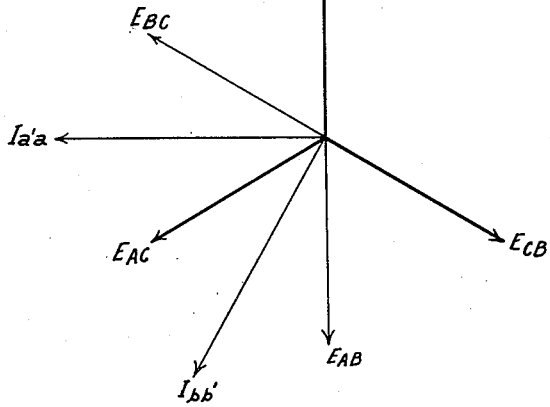

The features of my invention which are believed to be novel and patentable will be pointed out in the claims appended hereto. A better understanding of my invention may be obtained from the following description taken in connection with the accompanying drawings, in which Fig. 1 is a schematic circuit diagram of a connection-checking device together with a power-transmission system and an associated metering system; Fig. 2 is a conventional circuit diagram of wattmeters connected correctly and wattmeters with the potential elements interchanged; Figs. 3, 4, and 5 are vector diagrams used to explain the principle of operation of the apparatus; and Fig. 6 illustrates a modified form of switch for changing the relationships of the connections.

For the sake of explaining the nature and purpose of the invention, specific reference is made to a three-phase, three-wire system and a specific illustrative arrangement is shown in the drawings, but it will be understood that my invention is not limited to this exact arrangement. To facilitate the understanding of the purpose of the arrangement, a brief introductory statement is made of certain conditions in a metering system with two correctly connected wattmetric elements used in a balanced, three-phase, three-wire circuit. At unity power-factor, the watts on each element are equal and positive. Also, at unity power-factor, the torque on each element is zero if the potential leads are interchanged. At any other power-factor with the potential leads interchanged, the torques on each element are equal but opposite so that the algebraic sum is zero.

In order to make use of these conditions for checking the correctness of connections of a polyphase two-element power-responsive device 11, I provide a pair of single-phase, power-responsive devices, such as indicating wattmeters 12 and 13, which may be so connected in a measuring circuit that corresponding terminals of the device 11 being checked and the checking wattmeters 12 and 13 bear the same relation to the conductors of the measuring circuit. An interchange switch 14 is provided to permit interchanging the potential windings of the wattmeters 12 and 13. If both wattmeters 12 and 13 read the same and positive with the switch 14 in the "normal" position and if they both read zero with the switch 14 in the "interchange" position, there is an indication that the connections are correct, provided the power-factor is unity. The same indication might be obtained with an incorrect connection at a power-factor corresponding to a phase-angle of sixty degrees lagging or with another incorrect connection at a power factor corresponding to a phase-angle of sixty degrees leading. However, the power-factor will invariably be known at least approximately from the character of the load and the indication may be interpreted in the light of this knowledge. At this stage of the explanation, the case of a relatively large phase-angle will be disregarded. If it is known that the phase-angle between current and voltage is relatively small, that is, that the power-factor is nearly unity and it is observed that the wattmeters 12 and 13 read positive with unequal deflections when the switch 14 is in the "normal" position but equal and opposite with relatively small deflections when the switch 14 is in the "interchange" position, there is again an indication that the connections are correct.

Suitable switches are provided to permit making any changes in the actual connections of the watt-meters 12 and 13 that may be necessary to correct the connection in case they should not be correct. The external terminal arrangement, however, is left unaltered in order that it will continue to simulate that of the tested device 11. Reversing switches 15 and 16 are provided for reversing the potential connection of the wattmeters 12 and 13, respectively. A switch 17, which I call a permutation switch, is provided for bringing about any desired arrangement in the connections of the windings of the wattmeters 12 and 13 to the external potential terminals of the checking device, which are connected to the corresponding terminals of the device 11 being checked. As will be explained more in detail later on, the switches 15, 16, and 17 are manipulated until the wattmeters 12 and 13 deflect in a way to indicate that their connections are correct, and the positions of these switches indicate what changes should be made in the connections of the device 11, which is being checked.

If the power-factor of the circuit being measured is not unity, it is convenient to have means for obtaining the effect of unity power-factor in the wattmeters 12 and 13. Indeed, if the power-factor departs materally from unity, such means are very desirable in order to avoid confusion and difficulty in interpreting the indications. Accordingly, I may provide a phase-shifter 18 for bringing the corresponding currents and voltages in phase in the wattmeters 12 and 13. A phase-sequence indicator 19 is also provided in order that one may determine whether changing the setting of the phase shifter 18 in a given direction will have the effect of counteracting lagging or leading current.

For the sake of illustration, I have represented in Fig. 1 a power transmission system 20, a metering system 21 therefor including the meter or other power-responsive device 11, and a connection-checking device 23. The power transmission system shown is of the three-phase, three-wire type having a source of three-phase power 24 transmitting currents to a load 25 over three line conductors 26, 26', and 26".

The power-responsive device 11 comprises a potential winding 28 co-operating with a current winding 29 to form one element and a second potential winding 30 co-operating with a second current winding 31 to form a second element. It will be understood that in three-phase power-responsive devices, such as watt-hour meters, wattmeters, and power relays, the elements are ordinarily mechanically connected. Each winding has two terminals, but for the sake of reducing the necessary number of leads, one current terminal 32 may be made common to both current windings 29 and 31 (provided current transformers are used), and likewise, one of the potential terminals may be common to both potential windings 28 and 30. For the sake of identifying the corresponding potential terminals and conductors in all parts of the apparatus, these are marked in the drawings with the capital letters A, B, and C, the primed letters signifying points at the supply end of the system. The potential terminal or terminals common to the windings 28 and 30, which may be referred to as a neutral terminal, is designated by the letter N, and is also marked C, since it happens to be connected to the conductor leading from the point C in the metering system 21.

The metering system 21 includes, in addition to the power-responsive device 11, a pair of potential transformers 33 and 34, and a pair of current transformers 35 and 36. The potential transformers 33 and 34 have primary windings 37 and 38, respectively, with a common terminal C, and secondary windings 39 and 40, also with a common terminal C. The secondary winding 39 is connected to the potential winding 28 of the device 11, and likewise the secondary winding 40 is connected to the potential winding 30 of the device 11, in accordance with the well-known method of connecting polyphase power-responsive devices. The primary winding 37 is connected between lines 26" and 26' of the polyphase transmission system 20 and the primary winding 38 is connected between the lines 26' and 26.

The current transformer 35 has its primary winding in series with the line 26, and its secondary winding in series with the current winding 29 of the power-responsive device 11. Similarly, the current-transformer 36 has its primary winding in series with the line 26" and its secondary winding in series with the current winding 31. It will be apparent from an inspection of the connection diagram that the instrument connections shown are incorrect, the connection of the instrument transformer 36 being reversed, and the potential windings 28 and 30 being interchanged. In an actual installation, however, the connection diagram would not be before one, and the meter connector would be, in all probability, confronted with the mass of leads entering the device 11 without knowing how the current and potential leads were connected to the terminals of the current and potential transformers, respectively, and without knowing the internal connections of the transformers. The connections are shown incorrectly in the diagram for the purpose of explaining how my connection-checking device 23 is used to discover the fact that the connections are incorrect and to determine what changes in the connections are required.

A more detailed description of the connection-checking device 23 and its component parts will now be given. Preferably, for the sake of compactness and portability, the parts shown are mounted upon a panel 41 or in a cabinet with the indicating pointers visible and operating handles accessible. The panel 41 has mounted thereon three potential terminals permanently marked for identification in some suitable manner, as by the numerals 1, 2, and 3. The terminal 3 is also designated by the letter N to indicate that it is to be connected to the neutral potential terminal of the device being checked. Indicating lamps 42, 43, and 44 are connected between successive pairs of the terminals 1, 2, and 3, although these may be supplemented or replaced, if desired, by an indicating voltmeter or voltmeters. It is desirable that the lamps have a greater voltage rating than the normal voltage of the circuit. They may conveniently be lamps for double the normal voltage of the circuit.

A three pole switch 45 is interposed between the terminals 1, 2, and 3 and brushes $46_1$, $46_2$, and $46_3$ of the permutation switch 17. The form of permutation switch 17 shown in Fig. 1 is of the drum or barrel type having an insulating, rotatably mounted drum 49, represented for clearness by a developed surface. The drum 49 carries slip rings $50_1$, $50_2$, and $50_3$, co-operating with the brushes $46_1$, $46_2$, and $46_3$, respectively. It also carries 18 contact segments designated collectively by the numeral 53. The segments 53 are arranged in three horizontal rows of six each and three brushes $54_1$, $54_2$, and $54_3$, are provided for co-operation with the segments 53, each horizontal row of segments being adapted to make successive contacts with a different one of the brushes $54_1$, $54_2$, and $54_3$. Each of the slip rings $50_1$, $50_2$, and $50_3$, is connected to two of the segments 53 in each of the horizontal rows. The vertical rows of the segments 53 are numbered one to six to correspond to the six possible positions of the drum 49 in which the brushes $54_1$, $54_2$, and $54_3$ make contact. It will be apparent that the six positions of the drum 49 produce the six different possible ways in which the brushes $46_1$, $46_2$, and $46_3$ may be electrically connected to the brushes $54_1$, $54_2$, and $54_3$ in a three-conductor system.

The brushes $54_1$, $54_2$, and $54_3$ are connected to the terminals of the phase sequence indicator 19 and also to the input terminals 57 of the phase-shifter 18. The phase sequence indicator 19 may be of any desired type. Conveniently, it may be of a type having a movable element carrying an indicating pointer 58, similar, for example, to the phase sequence indicators disclosed in United States Patents 1,703,345, to Knapp, or 787,345 to Schuchardt.

The phase-shifter 18 may be of any desired type. A convenient type represented schematically in Fig. 1 is a type having a movable three-phase primary energized through slip rings from the three terminals 57 and a three-phase secondary connected to conductors designated $55_1$, $55_2$, and $55_3$, corresponding to the terminals 1, 2, and 3 when the drum switch 17 is in its normal position, number 1. The movable primary of the phase-shifter 18 carries an operating handle which may serve also as a pointer 59 and a scale 60 is provided to co-operate therewith. The scale 60 is graduated in degrees to indicate the change in phase of the voltage produced by rotation of the operating handle 59 but it might also be calibrated in per cent power-factor. Whether the change in phase produced by rotating the handle 59 in a given direction is in a lagging or leading direction depends upon the phase sequence of the potentials applied to the terminals 57 and the internal connection of the phase-shifter 18. However, it will be arbitrarily assumed that the connections are such that, when the arm 59 is rotated in the direction in which the pointer 58 of the phase sequence indicator 19 deflects, the potentials appearing in the secondary of the phase-shifter 18 will be rotated in a direction to overcome or decrease a lag of the currents in the watt meters 12 and 13 behind the potentials in these wattmeters.

Although I have referred to a phase-shifter of the relatively movable winding type, it will be understood that my invention is not limited thereto but obviously includes the use of other types of phase-shifters, such as those, e. g., of the auto-transformer type having stationary windings and movable contacts co-operating with a plurality of taps to obtain voltages having different phase relationships.

The conductors $55_1$ and $55_2$ leading from the phase-shifter 18 are connected to stationary contacts of the interchange switch 14 which may be any suitable form of reversing switch. The interchange switch has two positions marked "Normal" and "Interchanged". Its movable contacts are connected to conductors 61 and 62, which in turn are connected to stationary contacts of the reversing switches 15 and 16, respectively. The remaining conductor $55_3$ leading from the phase-shifter 18 is connected to stationary contacts of both reversing switches 15 and 16. Each reversing switch has two positions marked "Correct" and "Reversed". The movable contacts of the reversing switches 15 and 16 are connected to conductor pairs 63 and 64, respectively.

The wattmeters 12 and 13 may be of the usual deflecting type having potential windings 65 and 66 and current windings 67 and 68, respectively; but preferably they are of the zero-center type, having movable pointers 69 and 70 at rest in the center of the scales when the meters read zero. The potential windings are connected to the conductor pairs 63 and 64, respectively. Instead of indicating wattmeters, I may, of course, also use rotating disc watt-hour meters, or any other device capable of showing the presence and direction of power in an alternating-current circuit, and I use the term "watt-metric device" broadly to refer to any such devices. The wattmeters 12 and 13 may be marked for identification in the actual apparatus with suitable characters, such as the numerals 1 and 2.

It makes use of the apparatus more convenient, particularly for persons using the apparatus without engineering knowledge, to break the conductor pairs 63 and 64 and provide flexible leads 71, 72, 73, and 74 adapted to be plugged in to continue the circuits of the conductor pairs 63 and 64. Plug receptacles $63_1$, $63_3$, $64_2$, and $64_3$, marked in a suitable manner for identification in the actual apparatus as by numerals 1, 3 and 2, 3, are provided to co-operate with the flexible plug-in leads 71, 72, 73, and 74 and are connected to the movable contacts of the reversing switches 15 and 16. The flexible plug-in leads 71 to 74 permit simulating the connections of the tested device 11 exactly with those of the testing device 23. When the device 11 has its neutral potential terminal N on the right-hand side the leads 71 to 74 are plugged in as shown, but when the device 11 to be tested is one having its neutral potential terminal on the left-hand side, the leads 71 and 72 are interchanged and likewise the leads 73 and 74 are interchanged, since the numeral 3 has been utilized to designate terminals and conductors in the checking device 23 corresponding to the neutral terminal or lead N.

It will be observed that when the permutation switch 17 is in position 1, the interchange switch 14 is in the position "Normal", and reversing switches 15 and 16 are in the positions "Correct", the numerals 1, 2, and 3, used also as suffixes in the reference numerals, will designate corresponding leads or terminals throughout the checking device 23. The numerals 1 and 2 marking the wattmeter 12 and 13 will likewise correspond to the numbers of the conductors through which they are connected, each wattmeter being also connected to a number 3 or neutral conductor.

Current terminals 75, 76, and 77, 78, are mounted on the panel 41, for connection to the current windings 67 and 68 of the wattmeters 12 and 13, respectively. If desired, additional terminals 79 and 80 and connecting links 81 and 82 may be provided to facilitate temporarily connecting in or plugging in an ammeter in place of the connecting link 81 or 82 for checking current balance in the phases.

In making use of my apparatus to check the connections of a power-responsive device, the current windings are connected in series with corresponding current windings and the potential terminals are connected to corresponding potential terminals. More specifically, the current winding 67 of the upper checking wattmeter marked 1 is connected in series with the current winding 29 of the upper element of the device 11; the current winding 68 of the lower checking wattmeter marked 2 is connected in series with current winding 31 of the lower element of the device 11. Likewise, the neutral potential terminal 3 is connected through a lead $83_3$ to the neutral terminal C of the device 11; the terminal 1, corresponding to the upper checking wattmeter, also marked 1, is connected through a lead $83_1$ to the potential terminal B of the upper element of the device 11, and the lower terminal 2, corresponding to the lower checking wattmeter marked 2, is connected through a lead $83_2$ to the potential terminal A of the lower element of the device 11.

Initially, the switch 45 is left open. The indicating lamps are observed to see whether they are burning with equal brilliancy, assuming of course that they are lamps of substantially identical characteristics and ratings, thus indicating that the voltages are balanced. If the lamps burn with equal brilliancy, the switch 45 may be closed and the procedure of checking may be commenced. On the other hand, if one of the lamps burn with considerably greater brilliancy than the other two, this is an indication that the potentials are unbalanced and the irregularity must first be discovered and corrected. Such a condition might result, for example, from the fact that one of the windings 37, 38, 39, or 40 of the transformers 33 and 34 was reversely connected, separating their voltage vectors by 120° instead of 60°, and making the voltage between B and A on the secondary side 1.732 times each of the other two voltages instead of equal to them.

After the voltages have been ascertained to be balanced and the switch 45 has been closed, the checking device 23 is set or adjusted until the wattmeters 11 and 12 read equal and positive with the interchange switch 14 in the "normal" position and the wattmeters 11 and 12 both read zero with the switch 14 in the "interchange" position. The operations in the routine of setting may be carried out in any desired manner or order, but by way of example, I shall state one procedure which may be followed.

The phase-shifter 18 is set at zero, the interchange switch 14 is set at "interchange" and the permutation switch 17 is rotated until the wattmeters 12 and 13 either both read zero or read equal values. There will be three such positions, but ordinarily, if the power factor of the circuit is very close to unity, only that position need be considered at which the readings are lowest. If the readings are equal but not opposite, one of the reversing switches 15 or 16 is moved to its opposite position. The phase-shifter 18 is then adjusted until the readings fall to zero. Upon moving the interchange switch 14 to normal, both wattmeters will read equal values of the same sign and should read positive. If they do not read positive, both reversing switches 15 and 16 are moved to positions opposite to those in which they happen to be. The apparent power-factor or phase-angle is now read from the scale 60 of the phase-shifter 18, bearing in mind that movement of the pointers 58 and 59 in the same direction signifies lagging power-factor and movement in opposite direction signifies leading power factor. If the apparent power-factor agrees with what is known must be the true power-factor in view of the character of the load the check is completed; otherwise, the permutation switch is set at one of the other positions in which both wattmeters 12 and 13 read zero with the interchange switch 14 in the "interchange" position. It will be sufficient to know the true power-factor approximately within sixty degrees for the purpose of checking the apparent power-factor indicated by the pointer 59 against the true power-factor.

The positions of the reversing switches will of course indicate whether or not a winding of the corresponding element of the device 11 should be reversed. The position of the permutation switch 17 will indicate what rearrangement of the connection of the potential leads to the potential terminals of the device 11 should be made to correct the connections. For this purpose, the following table is used:

| Voltage leads to which terminals of device 11 should be connected | | | |
|---|---|---|---|
| Drum switch position | 1 | 2 | 3 |
| 6 | 2 | 3 | 1 |
| 5 | 3 | 2 | 1 |
| 4 | Leads to which terminals of device 11 happen to be connected. 3 | 1 | 2 |
| 3 | 2 | 1 | 3 |
| 2 | 1 | 3 | 2 |
| 1 | 1 | 2 | 3 |

The manner of reading the table above and the reason therefor will be apparent from the following:

Let us assume position 6 is the one which produces correct connections. When the permutation switch 17 is in position 6, the brush $54_1$ is connected to the brush $46_3$, the brush $54_2$ is connected to the brush 46, and the brush $54_3$ is connected to the brush $46_2$.

Therefore, the device should be so connected that the terminal of device 11 which is now connected to lead $83_1$ will be connected to the lead $83_3$; the terminal which is now connected to the lead $83_2$ will be connected to the lead $83_1$; and the terminal which is now connected to the lead $83_3$ will be connected to the lead $83_2$. In the case illustrated, this would mean connect terminal B of the device 11 to lead 83₃, connect terminal A of 11 to the lead 83₁; and connect terminal C of 11 to the lead 83₂.

The theoretical explanation for the operation of the apparatus is given in the following with the aid of the vector diagrams, Figs. 3, 4, and 5, and Fig. 2, which is a simplified diagram of connections of the wattmeters 12 and 13 when correctly connected and when the potential leads other than the neutral lead are interchanged, primed numerals being used to differentiate the meters having the interchanged connections.

Counterclockwise phase rotation is assumed so that in the vector diagrams, the phase angles of vectors representing lagging currents will be measured in a clockwise direction from the corresponding voltage vector, the phase angles of vectors representing leading currents will be measured in a counterclockwise direction from the corresponding voltage vector. Corresponding points in the transmission system 20 and the metering system 21 are designated by the same letters; viz., A, B, and C, capital letters being used in the vector diagrams to designate voltage, and small letters to designate currents. Points on the supply side are further designated by primed letters to prevent confusion as to the polarity of currents represented by the vectors.

The relationships of the currents and voltage in the wattmeters of Fig. 2 under balanced conditions and unity power-factor are shown by the vector diagram of Fig. 3. The potential winding 65 is connected from A to C and therefore has the voltage $E_{AC}$ impressed upon it. The co-operating current winding 67 is connected from A' to A and therefore carries the current $I_{a'a}$. The torque and deflection of the wattmeter 12 would therefore be proportional to the product of the vectors $E_{AC}$ and $I_{a'a}$ or the product of their scalar values (their lengths) times the cosine of the angle between them. Similarly, the torque and deflection of the wattmeter 13 would be proportional to the products of the vectors $E_{BC}$ and $I_{b'b}$. The two products are equal since the lengths of the voltage vectors are the same, the lengths of the current vectors are the same, and the angles between the current and voltage vectors are the same; as inspection of the diagram will show.

On the other hand, when the potential leads are interchanged, the wattmeter 12' reads the product of $E_{BC}$ and $I_{a'a}$, which are at 90° to each other, and the wattmeter 13' reads the product of $E_{AC}$ and $I_{b'b}$, which are also at 90° to each other. Since the product of vector quantities differing in phase by 90° is zero, both wattmeters read zero. The foregoing accounts for the fact that at unity power-factor the checking wattmeters 12 and 13 of Fig. 1 read equal positive values with the interchange switch 14 in the "normal" position and both read zero with the interchange switch 14 in the "interchange" position, if the tested device is correctly connected.

An analysis of what takes place while using the checking device 23 to discover the errors in the connections of the power-responsive device in Fig. 1 will serve to demonstrate the principle of operation of my invention. It will be assumed that the load 25 is balanced and drawing lagging current with a power-factor angle of 30°. The current and voltage relationships are shown in the vector diagram, Fig. 4. The phase currents $I_{ba}$, $I_{ac}$, and $I_{cb}$, each lag 30 degrees behind the phase voltages $E_{BA}$, $E_{AC}$, and $E_{CB}$, respectively. It is evident from Fig. 1 that the line current $I_{b'b}$ is the vector sum of the phase currents $I_{bc}$ and $I_{ba}$. Likewise, the line current $I_{a'a}$ is the vector sum of the phase currents $I_{ac}$ and $I_{ab}$. It is also evident from Fig. 1 that the current winding 29 of the upper element of the power-responsive device 11 carries the current $I_{a'a}$. The other current winding 31, however, carries the reversed current $I_{bb'}$, since the current transformer 36 has its connections reversed. The voltage $E_{BC}$ is associated with the current $I_{a'a}$ and the voltage $E_{AC}$ is associated with the current $I_{bb'}$.

In order to check the connections by means of the device 23, it is connected as shown and previously described. To begin with, the reversing switches 15 and 16 are placed in the "correct" positions. The results obtained with the permutation switch 17 in its various positions are given in the table below. The readings of the checking wattmeters 12 and 13 are equal to voltage times current times cosine of the angle between voltage and current. For simplicity, it will be assumed that the produce of voltage and current is unity. In the table the letters refer to points in the metering system and to the vector diagrams, and the numerals refer to the terminals of the checking wattmeters 12 and 13, which are brought into connection with corresponding lettered points by manipulation of the test switches.

| Position of permutation switch 17 | Corresponding terminals of line and checking device | | | Vector diagram | Interchange switch, 14, "Normal" | | | | Interchange switch, 14, "Interchanged" | | | |
|---|---|---|---|---|---|---|---|---|---|---|---|---|
| | | | | | Upper meter (12) | | Lower meter (13) | | Upper meter (12) | | Lower meter (13) | |
| | 54₁ | 54₂ | 54₃ | Fig. | $E_{13}$ | Prod. $E_{13}xI_{a'a}$ | $E_{23}$ | Prod. $E_{23}xI_{b'b}$ | $E_{23}$ | Prod. $E_{23}xI_{a'a}$ | $E_{13}$ | Prod. $E_{13}xI_{b'b}$ |
| | | | | | Phase-shifter 18 at 0° | | | | | | | |
| 1 | B | A | C | 4 | BC | +.500 | AC | +.500 | AC | 1.00 | BC | −.500 |
| 2 | B | C | A | 4 | BA | −.500 | CA | −.500 | CA | −1.00 | BA | −1.00 |
| 3 | A | B | C | 4 | AC | +1.00 | BC | −.500 | BC | +.500 | AC | +.500 |
| | | | | | Switch 16 is moved to "reversed" position. | | | | | | | |
| 3 | A | B | C | 4 | AC | +1.00 | CB | +.500 | BC | +.500 | CA | −.500 |
| | | | | | Phase shift voltages 30 degree lag. | | | | | | | |
| 3 | A | B | C | 3 | AC | .866 | CB | .866 | BC | .000 | CA | .000 |
| | | | | | Phase-shifter 18 is moved back to zero. Switch 16 is moved back to "correct" position. | | | | | | | |
| 4 | A | C | B | 4 | AB | +.500 | CB | +.500 | CB | −.500 | AB | +1.00 |
| 5 | C | A | B | 4 | CB | −.500 | AB | 1.00 | AB | .500 | CB | +.500 |
| | | | | | Switch 15 is moved to "reversed" position. | | | | | | | |
| 5 | C | A | B | 4 | BC | +.500 | AB | 1.00 | BA | −.500 | CB | +.500 |
| | | | | | Phase shift voltages 30 degrees lead. | | | | | | | |
| 5 | C | A | B | 5 | BC | +.866 | AB | .866 | BA | .000 | CB | .000 |
| | | | | | Phase-shifter 18 is moved back to zero. Switch 15 is moved back to "correct" position. | | | | | | | |
| 6 | C | B | A | 4 | CA | −1.00 | BA | −1.00 | BA | −.500 | CA | −.500 |

When the permutation switch is in the position 1, the brushes 54₁, 54₂, and 54₃ are connected to terminals B, A, and C, respectively, of the device 11. The checking watt-meter 12, having its potential terminals connected to brushes 54₁ and 54₂ measures the product of $E_{BC}$ and $I_{a'a}$, which is cos 60° = +.500. Similarly, the checking wattmeter 13 measures the product of $E_{AC}$ and $I_{bb'}$, which is cos 60° = +.500. The angles are obtained from vector diagram, Fig. 4. In like manner, when the interchange switch 14 is moved to interchange, the wattmeter 12 reads 1.00 which is the cosine of the angle 0°, between $E_{AC}$ and $I_{a'a}$, and the wattmeter 13 reads —.500, which is the cosine of the angle 120°, between $E_{BC}$ and $I_{bb'}$. The readings for the other positions of the permutation switch 17 may be deduced from the vector diagrams in like manner, as indicated by the table.

In the vector diagrams, Figs. 3 and 5 representing the effect of shifting the voltages 30 degrees lagging and leading, respectively, the angular positions of the voltage vectors are shown as in Fig. 4 and the proper relationship between the voltage and current vectors is obtained by shifting the current vectors.

It is evident from the foregoing table that positions 3 and 5 are the only ones which meet the initial requirements of an indication of a correctly connected instrument; viz., that both wattmeters read the same value when the switch 14 is in the "interchange" position and phase-shifter 18 is at zero. Appropriate movement of the phase-shifter 18 and the reversing switches 15 or 16 makes the wattmeters read zero when the switch 14 is at "interchange" and makes them read equal positive values when the switch 14 is at "normal", thus satisfying the secondary requirements of indications of a correctly connected instrument. The final choice is obtained from the power-factor indication, which is 30 degrees lagging in position 3 and 30 degrees leading in position 5. The person checking the connections would doubtless have sufficient knowledge of the circuit to know that the current was not leading. The final setting of the switches for position 3 therefore indicates the correct connections of the power-responsive device 11. As the switch 16, associated with the lower element, is in the position "reversed", either the current or voltage connections to the lower element of the device 11 must be reversed. From the table given in connection with the explanation of the use of the permutation switch 17 one would ascertain that, for position 3, the terminals of device 11 now connected to the voltage leads 1 and 2 should be interchanged; i. e., the leads connected to terminals B and A should be interchanged.

It would have been possible to obtain a balance with position 2 also of the permutation switch 17 but in order to do so, it would have been necessary to move the phase-shifter through 90 degrees indicating zero power-factor. There would, therefore, be no need to consider this setting.

From the foregoing example it will be seen that there are two incorrect settings and one correct setting of the permutation switch at which a balance will be obtained, but that only the correct setting produces a power-factor indication corresponding to the true power-factor of the load. The various indicated power-factors for different permutation switch positions, corresponding to various actual power-factors when the meter connection is correct are given in the table below:

| Connection of meter | Power factor of load | Power factor indicated when balance is obtained at different drum switch | | |
|---|---|---|---|---|
| | | Position #1 | #4 | #6 |
| Correct | Unity | Unity % or 0° | 60 deg. lag | 60 deg. lead |
| Do | 10 deg. lag | 10 deg. lag | 70 do do | 50 do do |
| Do | 20 do do | 20 do do | 80 do do | 40 do do |
| Do | 30 do do | 30 do do | 90 do do | 30 do do |
| Do | 40 do do | 40 do do | 80 do lead | 20 do do |
| Do | 50 do do | 50 do do | 70 do do | 10 do do |
| Do | 60 do do | 60 do do | 60 do do | Unity |
| Do | 70 do do | 70 do do | 50 do do | 10 deg. lag |
| Do | 80 do do | 80 do do | 40 do do | 20 do do |
| Do | 90 do do | 90 do do | 30 do do | 30 do do |
| Do | 80 do lead | 80 do lead | 20 do do | 40 do do |
| Do | 70 do do | 70 do do | 10 do do | 50 do do |
| Do | 60 do do | 60 do do | Unity | 60 do do |
| Do | 50 do do | 50 do do | 10 deg. lag | 70 do do |
| Do | 40 do do | 40 do do | 20 do do | 80 do do |
| Do | 30 do do | 30 do do | 30 do do | 90 do do |
| Do | 20 do do | 20 do do | 40 do do | 80 do lead |
| Do | 10 do do | 10 do do | 50 do do | 70 do do |

In Fig. 6, I have shown another form of permutation switch which serves the same purpose as the drum switch 17. In the arrangement of Fig. 6, six sockets 84 are employed, representing the six possible ways of joining the ends of two groups of three conductors, and a three prong plug connector 85 is provided for insertion in any one of these six sockets 84. The sockets 84 are provided with keyways or slots 86 and the plug 85 is provided with a projection 87 in order that the plug 85 can be inserted into the sockets 84 only with the proper relationship between the contacts.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. Apparatus for checking the connections of a polyphase alternating-current power-responsive device comprising in combination, three potential terminals adapted to be connected to the potential terminals of a power-responsive device, the connections of which are to be checked, a phase shifter having three input terminals and three output terminals, a permutation switch connecting said potential terminals to said input terminals, a phase-sequence indicator connected to one set of terminals of said phase shifter, a potential interchange switch connected to said output terminals, a pair of potential reversing switches connected to said potential interchange switch, and a pair of wattmetric devices having potential windings, each connected to one of said potential reversing switches and having current windings, each adapted to be connected in series with a current terminal of the power-responsive device, the connections of which are to be checked.

2. Apparatus for checking the connections of a polyphase alternating-current power-responsive device comprising in combination, a pair of single-phase wattmetric devices having potential and current windings, a three-conductor potential transmitting system adapted to be connected at one end to the potential terminals of a power-responsive device, the connections of which are to be checked, connected at the other end to the potential windings of said wattmetric devices, and having interposed therein, a permutation switch, a phase-sequence indicator, a phase-shifting device, a potential interchange switch, and a pair of double-pole potential reversing switches having one pole of each common on the side toward the potential interchange switch.

3. Apparatus for checking the connections of a polyphase alternating-current power-responsive device comprising in combination, a pair of single-phase wattmetric devices having current windings adapted to be connected in series with the current terminals of a power-responsive device, the connections of which are to be checked and having potential windings adapted to be connected interchangeably to the potential terminals of the device to be checked, means for reversing the connections of said potential windings independently, means for varying the phase relationship between the potential terminals of the device to be checked and the wattmetric devices, a phase-sequence indicator, and means for providing a plurality of combinations of connections between the terminals of said wattmetric devices and the potential terminals of the device to be checked.

4. Apparatus for checking the connections of a polyphase alternating-current power-responsive device comprising in combination, a pair of single-phase wattmetric devices having current windings adapted to be connected in series with the current terminals of a power-responsive device, the connections of which are to be checked and having potential windings adapted to be connected interchangeably to the potential terminals of the device to be checked, means for reversing the connections of said potential windings independently, means for indicating the relationship between the potential terminals of said wattmetric devices and the potential terminals of the device to be checked, means for varying the phase relationship between the potential terminals of the device to be checked and the wattmetric devices, and a phase-sequence indicator.

5. Apparatus for checking the connections of a polyphase alternating-current power-responsive device comprising in combination, a pair of single-phase wattmetric devices having current windings adapted to be connected in series with the current terminals of a power-responsive device, the connections of which are to be checked and having potential windings adapted to be connected interchangeably to the potential terminals of the device to be checked, means for indicating the relationship between the potential terminals of said wattmetric devices and the potential terminals of the device to be checked, means for varying the phase relationship between the potential terminals of the device to be checked and the wattmetric devices, and a phase-sequence indicator.

6. Apparatus for checking the connections of a polyphase alternating-current power-responsive device comprising in combination, a pair of single-phase wattmetric devices having current windings adapted to be connected in series with the current terminals of a power-responsive device, the connections of which are to be checked, and having potential windings adapted to be connected interchangeably to the potential terminals of the device to be checked, and means for indicating the relationship between the potential terminals of said wattmetric devices and the potential terminals of the device to be checked.

7. Apparatus for checking the connections of a power-responsive device for use with a polyphase alternating-current circuit having a plurality of line conductors, which apparatus comprises in combination a plurality of single-phase wattmetric devices, one less in number than the number of line conductors in said polyphase circuit, said wattmetric devices having current windings adapted to be connected in series with the current terminals of a power-responsive device, the connections of which are to be checked, and having potential windings adapted to be connected interchangeably to the potential terminals of the device to be checked, and means for indicating the relationship between the potential terminals of said wattmetric devices and the potential terminals of the device to be checked.

8. Apparatus for checking the connections of a polyphase alternating-current power-responsive device comprising in combination, three potential terminals adapted to be connected to the potential terminals of a power-responsive device, the connections of which are to be checked, a pair of wattmetric devices, each having a potential winding with independent terminals and with a terminal common to both windings, a permutation switch having input terminals connected to said potential terminals of the checking apparatus, and output terminals connected to said terminals of the wattmetric devices, and means for interchanging the connections to the independent terminals of said wattmetric devices.

9. In a three-wire polyphase metering system comprising two potential transformers, two current transformers, and a polyphase power-responsive device, an arrangement for checking the connections comprising a pair of single-phase wattmetric devices having potential windings, means for interchanging the connections of said potential windings with respect to the potential terminals of the power-responsive device, and means for indicating the relationship between the connections.

10. In a three-conductor polyphase metering system having a power-responsive device with potential and current terminals, an arrangement for checking the connections of said power-responsive device comprising a pair of single-phase wattmetric devices having current windings adapted to be connected in series with the current terminals of said device to be tested and having potential windings with terminals adapted to be connected interchangeably to the potential terminals of said device to be tested, and means for indicating the relationship between the connections of the potential terminals of said wattmetric devices and said device to be tested.

11. In a polyphase metering system having a power-responsive device with potential and current terminals, an arrangement for checking the connections of said power-responsive device comprising a plurality of single-phase wattmetric devices having current windings adapted to be connected in series with the current terminals of said device to be tested and having potential windings with terminals adapted to be connected interchangeably to the potential terminals of said device to be tested, and means for indicating the relationship between the connections of the potential terminals of said wattmetric devices and said device to be tested.

CHARLES H. THAYER.